S. SHAPIRO.
AERATING COVER FOR MILK CANS.
APPLICATION FILED MAY 11, 1910.
975,725.
Patented Nov. 15, 1910.
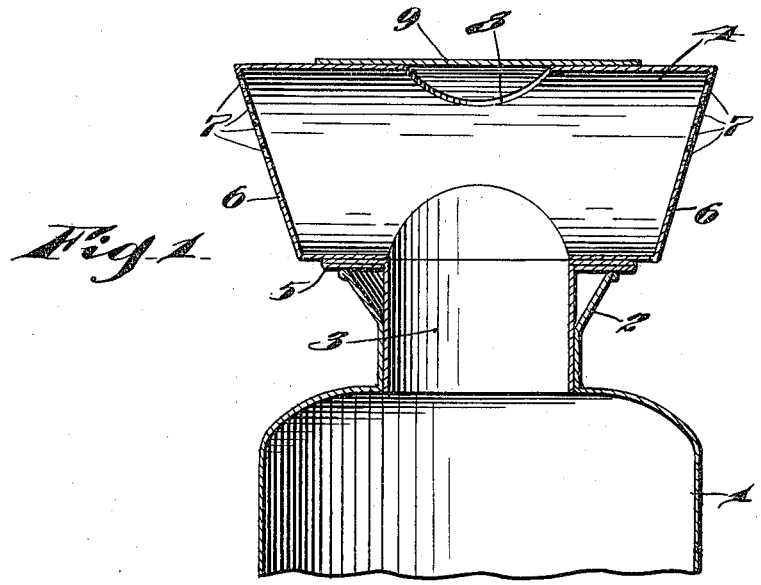
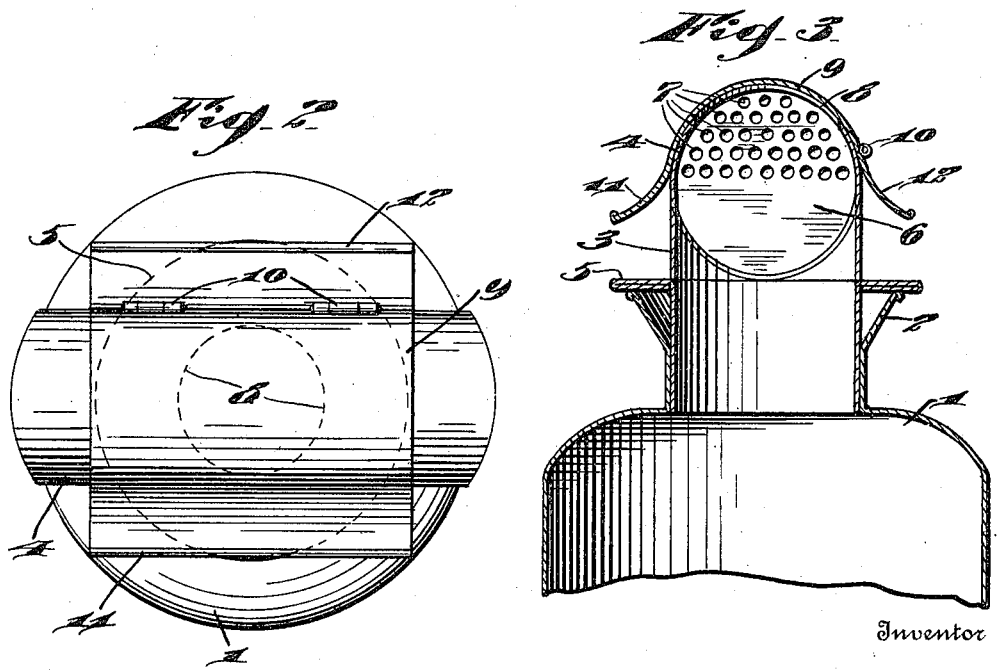
Witnesses
Inventor
Samuel Shapiro,
By Joshua R. H. Potts
Attorney

UNITED STATES PATENT OFFICE.

SAMUEL SHAPIRO, OF PHILADELPHIA, PENNSYLVANIA.

AERATING-COVER FOR MILK-CANS.

975,725.

Specification of Letters Patent. Patented Nov. 15, 1910.

Application filed May 11, 1910. Serial No. 560,622.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Aerating-Covers for Milk-Cans, of which the following is a specification.

My invention relates to improvements in aerating covers for milk cans, an object of the invention being to provide a cover of this character which permits the free escape of animal gases, and enables milk to be poured into the can from time to time without removing the cover from the can, therefore enabling the device to be used on cans which are awaiting the milk from the cows.

A further object is to provide an improved aerating cover for cans, which while it permits a circulation of air through the cover to carry off the animal gases from the milk, excludes rain or other water which might fall upon the cover.

With these and other objects in view, the invention consists in certain novel features of construction and combinations and arrangements of parts, as will be more fully hereinafter described and pointed out in the claims.

In the accompanying drawings: Figure 1, is a view in vertical longitudinal section illustrating my improvements in position on a milk can. Fig. 2, is a top plan view, and Fig. 3, is a view in vertical cross section of Fig. 1.

1, represents the body of an ordinary milk can, and 2 the neck thereof.

My improved aerating cover is of general T-shape, that is it has a vertical cylindrical portion 3 to fit into the neck 2, and a horizontal cylindrical portion 4 which is secured to and communicates with the portion 3, having free open communication therewith. The vertical portion 3 is provided with an annular flange 5, adapted to rest on top of the neck 2, and project over the edge of the latter, so as to prevent any moisture from the cover entering the can. The ends of the horizontal portion 4 are inclined inward from their upper to their lower ends, so that rain water will not drive into the ends of the portion 4. These ends 6 are perforated in their upper halves, as shown at 7 to allow a free circulation of air through the portion 4, to carry off the animal gases from the milk. In the top of the horizontal portion 4, and registering with the vertical portion 3, an opening 8 is provided for the reception of any ordinary screen (not shown) through which the milk is poured into the can to catch the dirt in the milk, thus enabling the milk to be poured into the can while the cover is in position thereon. This is especially desirable during the milking operation, as the pails containing the fresh milk may be emptied into the screen and poured into the milk can without any danger of foreign matter getting into the can, and at the same time subjecting this milk in its pouring operation to the currents of air passing through the horizontal portion 4, so as to remove a large percentage of the animal gases.

9, represents a cover which is hinged at 10, and is adapted when thrown over in closed position to close the opening 8. The free end of this cover is flared outward as shown at 11, to shed the water over the neck of the can and a fixed water-shed 12 of similar shape is provided adjacent the hinge 10, so that rain water falling on the cover will be thrown outward, and not find its way into the neck of the can.

While I have shown the parts 3, and 4, of a particular shape, I would have it understood that I do not confine myself to any particular shape of the device, but claim broadly the idea of two members or sections having communication with the other, one adapted to fit into the neck of the can, and the other provide an air passage at right angles thereto for carrying off the animal gases from the milk. I therefore, consider myself at liberty to make such changes and alterations as fairly fall within the spirit and scope of the appended claims.

Having thus described my invention, what I claim as new and desire to secure by Letters Patent is:

1. An aerating cover for milk cans, comprising two sections or members having communication with each other, one member adapted to fit into the neck of a milk can, and the other member supported thereon, of substantially the same diameter and located at right angles thereto, and having openings in its ends whereby an air passage is provided across the other member, substantially as described.

2. An aerating cover for milk cans, comprising two members communicating with each other, one member adapted to fit in the neck of a milk can, the other member projecting at right angles thereto having perforations in its ends, also having an opening in its top in register with the member to be positioned in the can, and a hinged cover normally closing said opening, substantially as described.

3. An aerating cover for milk cans, comprising two members secured together and communicating with each other, one member adapted to be positioned in the neck of a milk can, the other member projecting at right angles thereto, an annular flange around the first mentioned member adapted to project over the upper end of the milk can neck, the ends of said last mentioned member inclining inward from their upper to their outer ends, and perforated in their upper halves, said last mentioned member having an opening in its top, and a hinged cover normally closing said opening, substantially as described.

In testimony whereof I have signed my name to this specification in the presence of two subscribing witnesses.

SAMUEL SHAPIRO.

Witnesses:
R. H. KRENKEL,
C. E. POTTS.